United States Patent Office 2,896,717
Patented July 28, 1959

2,896,717

AVOIDING INCREASED WATER PRODUCTION IN FRACTURING OPERATIONS

George C. Howard, Tulsa, Okla., assignor to Pan American Petroleum Corporation, a corporation of Delaware No Drawing. Application December 28, 1956
Serial No. 631,067

4 Claims. (Cl. 166—33)

This invention relates to hydraulic fracturing of oil-bearing formations penetrated by wells.

Frequently, oil-bearing formations penetrated by wells are subjected to hydraulic pressure to fracture the formations and increase the flow of oil to the well. Sometimes the fractures extend into water-bearing zones. The result may be a greatly increased production of water as well as oil.

An object of this invention is to provide a method which will decrease the tendency of fractures to penetrate water-bearing zones and will seal such fractures as may form in such zones. Other objects will be apparent to those skilled in the art from the following description and example.

In general, I accomplished the objects of my invention by injecting into the formation ahead of at least a part of the fracturing fluid a treating solution designed to form a precipitate when diluted with water. When such a treating solution is used as a part of, or ahead of, the usual fracturing fluid and the fracture enters a water-bearing zone, the water dilutes the treating solution and causes a precipitate to form. The precipitate increases resistance to flow in this portion of the fracture thus tending to divert the fracture in a direction outside the water-bearing zone. Even if the fracture, or a branch of it, continues to form in the water-bearing zone, the fracture is sealed when the well is again produced and flow is reversed. When the reversal of flow occurs, water flows back through the treating solution deposited in the fracture and in the formation adjacent the fracture. A heavy precipitate results which plugs the fracture and prevents flow of water through the fracture to the well.

The treating solution must be unusually effective for plugging off water since only a small amount can be used because of economic reasons. In addition, the solution must be able to plug large fractures. I have found that such a solution can be prepared by dissolving rosin polymers in a solvent such as a water miscible alcohol. Solutions of this type are described in more detail and are claimed in co-pending U.S. patent application S.N. 631,277, filed by William G. Bearden, Robert P. Murphy, Jr., and Platho P. Scott, Jr., on December 28, 1956.

The rosin polymers are preferably produced by the sulfuric acid polymerization of rosin dissolved in a solvent such as gasoline, benzene, carbon tetrachloride, or the like. The polymers and the method by which they are produced are described in more detail in U.S. Patents 2,017,866 Morton; 2,108,928 Rummelsburg; and 2,136,525 Rummelsburg. The polymerization should be carried to such an extent that the average molecular weight of the resulting polymers is at least about 450, as measured in acetone, and the melting point, or more properly, the softening point, is at least about 100° C. by the ASTM ball and ring method. Preferably the molecular weight should be about 500 and the softening point about 140° C. The higher softening point is, of course, highly important in treating formations having high temperatures.

The desired polymers may be produced in a single step of polymerization using long reaction times of 5 or 6 hours, high sulfuric acid concentrations of about 80 percent, in amounts equal to about 20 percent by weight of the rosin, and high reaction temperatures of about 50° C. Preferably, however, the polymerization should be carried out under much milder conditions to produce a smaller degree of polymerization with correspondingly decreased decomposition, isomerization, disproportionation, oxidation, and the like. The desired average molecular weight and softening point can then be produced by separation of at least part of the monomers away from the polymers. This separation may be accomplished by vacuum distillation, for example.

The polymers will generally contain some monomers as well as some rosin oils and the like. The term "rosin polymers" is intended to include this entire mixture of materials. Thus, when the average molecular weight and softening point of the rosin polymers are said to be 500 and 140° C. respectively, these values apply to the entire mixture and not to just the polymers present in the mixture. Likewise, when a rosin polymer concentration of 50 percent is mentioned, for example, the 50 percent refers to the concentration of the entire mixture of polymers, monomers, oils, and the like.

The solvent employed may be any liquid which is a good solvent for the rosin polymers, is oil-soluble, and is miscible in all proportions with water. The solvent should be able to form solutions of the polymers containing at least about 40 percent by weight of the polymers. This is because solutions containing smaller concentrations of the polymers do not form sufficiently effective plugs in water zones. In order to assure at least 90 percent reduction in permeability of the water-bearing zones, the concentration of polymers in the solution should be at least about 40 or 50 percent by weight of the solution. Preferably, the solutions should contain at least about 60 percent by weight of the rosin polymers. Such solutions have higher viscosities than solutions containing lower concentrations of the polymers. The viscous solutions are more suitable to perform their dual functions of fracturing and water shut-off. The solvent must, of course, be capable of dissolving these high concentrations of rosin polymers.

The preferred class of solvents consists of the saturated aliphatic alcohols containing from 1 to 3 carbon atoms per molecule. Preferably, isopropanol should be used since solutions of the rosin polymers in this solvent are much more viscous than those in methanol, for example. In addition, isopropanol is by far the least expensive solvent, with the exception of methanol. Other alcohols such as normal propanol, tertiary butanol, monoethyl ether of ethylene glycol, and the like, are also miscible with water in all proportions, are oil-soluble, are good solvents for rosin polymers, and generally form solutions having high viscosities. Such alcohols are also operable for my purposes but are not preferred principally because of their higher cost.

A few non-alcoholic solvents such as acetone or dioxane can be used to prepare solutions of rosin polymers suitable for our purposes. Limited solubility of the rosin polymers in such solvents, leading to turbid solutions, normally excludes such solvents from the preferred group. In addition, most such solvents are very expensive.

Mixtures of the above solvents with each other can be used if desired. In addition, special solvents, for example, other alcohols such as amyl alcohol, ethers such as diethyl ether, esters such as ethyl acetate, ketones such as methyl ethyl ketone, and the like, which are not completely miscible in all proportions with water, can also be used in small amounts mixed with the completely water-miscible solvents. Such special solvents must be slightly water-soluble and should be used only in amounts which will cause the mixed solvents to be completely water miscible in all proportions. When the term "consisting essentially of" is used hereinafter in connection with the definition of a composition, the term is intended to include compositions containing, in addition to the principal components, other ingredients such as the solvents described above, in amounts which do not affect the properties of the composition in a manner and to a degree adverse to the intended use of the composition.

Preparation of solutions of the rosin polymers in solvents presents a problem. Normally, when a treating solution includes a solvent such as methanol which is readily available locally, it is customary to mix such a solvent with the solute at the well to save freight charges on shipment of the solvent from the source of the rosin polymers. It has been found, however, that even if the rosin polymers are ground to pass a ½-inch screen, the rate of solution in solvents is slow. For example, 8 to 12 hours may be required to dissolve the rosin polymers in a mixture of methanol and isopropanol by use of a propeller-type stirrer in a tank containing the polymers and solvent. Generally, it is undesirable to tie up equipment at a well for this length of time while performing a mixing operation. The solution rate is increased by heating but this introduces a fire hazard and the advantage is not great until the softening point of the polymers is reached. Since this temperature is far above the boiling point of most of the desirable solvents, pressure equipment, not usually available in the field, is required.

Although any of the above techniques may be employed to prepare water shut-off solutions in the field, it is generally preferred to prepare the solutions in the manufacturing plant where the rosin polymers are made, or at a central point near fields containing wells to be treated. This solution is then shipped to the well in drums or tank trucks ready for use. Special techniques can be used in the manufacturing plant to prepare solutions having concentrations above 60 percent by weight or rosin polymers. Such solutions cannot be prepared by normal mixing means in the field in any reasonable length of time. For example, solutions containing as much as 70 percent of rosin polymers in isopropanol can be prepared and used if desired.

The quantity of treating solution to be used depends principally upon the extent of the fracture to be made. If the fracture is to be small, the quantity of treating solution can also be small. If the fracture is to extend a large distance from the well, a larger amount of treating solution should be used. This will insure the presence of some of the treating solution if the fracture extends into a water-bearing zone near its outer extremity. The extent of the fracture depends principally, in turn, on the quantity of hydraulic fracturing fluid employed. It is most convenient for this reason to use an amount of treating solution which is proportional to the quantity of fracturing fluid which is employed. The volume of treating solution should be at least about 5 percent of that of the fracturing fluid. This is to insure that the treating solution does not become so diluted with oil in the formation, or oil used as a fracturing fluid, to prevent adequate precipitation of rosin polymers when the treating solution contacts water in a water-bearing zone. Preferably, about 10 to 20 percent as much treating solution as fracturing fluid should be used. The upper limit is principally economic in nature since the treating solution itself is a good fracturing fluid, particularly if isopropanol is used as the solvent. Such solution can perform both the functions of fracturing and water shut-off. Typically, if a small hydraulic fracturing job is to use about 1,000 gallons of fracturing fluid, the amount of treating solution should be at least about 50 gallons and possibly as much as about 200 gallons. For a large job using about 25,000 gallons of fracturing fluid, the quantity of treating solution should be at least about 1,250 gallons, and possibly as much as about 5,000 gallons.

In the simplest application of the process, the batch of treating solution is first introduced into a well and is followed by the principal fracturing fluid. The fracture under these circumstances is usually initiated by the treating solution. This solution then flows along the fracture extending the fracture and being displaced into the formation by the fracturing fluid. When the desired amount of fracturing fluid has been displaced into the formation, the well is returned to production. Flow is thereby reversed. If the fracture is wholly in the oil zone the oil simply dilutes the treating solution and forces it out of the formation through the fracture and into the well. Some rosin polymers may have been precipitated due to water in oil-bearing zones or due to mixing with water in the fracturing fluid. In such case, the oil rapidly dissolves such precipitated rosin polymers and removes them from the oil-bearing zone. If the fracture enters a water-bearing zone, however, the reversal of flow, when the well is produced, causes water to flow into the treating solution, diluting the solution and precipitating rosin polymers in the fracture and in the formation adjacent the fracture. Thus, any portion of the fracture in a water-bearing zone is effectively sealed to prevent flow of water through the fracture to the well.

During the injection of the treating solution and the fracturing fluid into the formation it may be desirable to release the pressure occasionally. If possible, a little backflow of fluids should be initiated. The purpose is to cause more adequate mixing of water and treating solution in any branch of the fracture extending into the water zone. The resistance to flow of fracturing fluid into such branches is thus inhibited while flow into portions of the fracture in oil-bearing zones is not decreased. Therefore, the tendency to fracture in the water zones is decreased while the tendency to fracture in oil zones is not. The same action occurs to some extent whether the pressure release step is employed or not. However, the action is greatly enhanced by this step.

It will be apparent that many variations of my method exist. For example, the fracture may be initiated by injecting a part of the fracturing fluid ahead of the treating solution. The remainder of the fracturing fluid is then introduced into the well after the treating solution. The treating solution may be divided into several small batches alternated with batches of fracturing fluid. Many other variations will occur to those skilled in the art, including the many various hydraulic fracturing methods which have been proposed. The essential feature in my process in all such variations is preceding at least a portion of the fracturing fluid by a batch of treating solution.

The fracturing fluid may, in general, be any of the various fracturing fluids described in the prior art. For example, it may be crude petroleum from which the light ends have been removed by weathering or distillation. It may also be an emulsion. Preferably, the emulsion should be of the water-in-oil type such as those described in U.S. Patent 2,681,889 Menaul et al. This is to avoid excessive mixing of the water with the treating solution with consequent premature precipitation of rosin polymers. It is possible, however, to use an oil-in-water type emulsion such as those described in co-pending U.S. patent application S.N. 437,853, filed by Paul L. Menaul on June 18, 1954, now U.S. Patent 2,801,218. Even a water base fracturing fluid such as a starch solution may be employed since if precipitation of rosin polymers occurs in the oil zone, these polymers are quickly dissolved when the direction of flow is reversed by producing the well. Preferably, if a fracturing fluid is used which has water as a continuous phase, a batch of solvent or oil should be injected between the treating solution and fracturing fluid to avoid excessive mixing of water into the treating solution.

The following example will illustrate the application of a preferred form of my invention to a well. The well is 5,000 feet deep, casing is set at 4,980 feet leaving 20 feet of open hole below the casing seat. Tubing is run in the well and a packer is set between the tubing and casing at the bottom of the casing. The fracturing fluid to be used is 10,000 gallons of weathered crude oil having a flash point of 120° F. and a viscosity of 50 centipoises. The treating solution consists essentially of about 60 percent by weight of rosin polymers and 40 percent by weight of isopropyl alcohol. The rosin polymers are Dymerex resin which has been produced by mild sulfuric acid polymerization of rosin followed by vacuum distillation to remove sufficient monomers to increase the average molecular weight to about 500 and the softening point (ASTM ball and ring) to about 140° C. The treating solution has a viscosity of about 300 centipoises.

About 500 gallons of the fracturing fluid are first pumped into the tubing and are followed by about 1,000 gallons of treating solution. As soon as the fracturing fluid reaches the bottom of the well, sufficient pressure is applied to fracture the formation. Continued application of pressure causes the initial batch of fracturing fluid and the treating solution to flow into the fracture and extend it. The batch of treating solution is followed into the tubing by more fracturing fluid. After an additional 1,000 gallons of fracturing fluid has followed the treating solution, gas is injected into the tubing under pressure to force the fracturing fluid down the tubing and into the formation. As soon as the gas has been pumped approximately to the bottom of the tubing, the tubing pressure is released causing reversal of flow to take place in the fracture. Thereupon, liquids flow out of the formation into the fracture and back toward the well. If a portion of the fracture has entered a water-bearing zone the process causes this portion of the fracture to become plugged.

After a little backflow has been permitted, an additional 5,000 gallons of fracturing fluid is pumped down the tubing and is followed by gas. Again pressure is released to cause backflow in the fracture to plug any portions of the fracture entering water zones. The remainder of the fracturing fluid is then pumped into the tubing and into the fracture to extend it. Finally, the well is again produced at an increased oil producing rate without excessive water production.

I claim:

1. In a method for treating an oil-bearing formation penetrated by a well in which a fracturing fluid is injected into the well and then into said formation under sufficient pressure to fracture the formation, and in which a water-bearing zone is closely associated with said oil-bearing formation, the improvement comprising introducing into said well and into said formation ahead of at least a portion of said fracturing fluid a volume of treating solution equal to at least about 5 percent of the volume of fracturing fluid, said treating solution consisting essentially of from about 40 to about 60 percent by weight of rosin polymers having an average molecular weight of at least about 450 and a softening point of at least about 100° C. and from about 60 to about 40 percent by weight of an oil-soluble solvent for said rosin polymers, said solvent being miscible in all proportions with water.

2. The method of claim 1 in which said solvent is a saturated aliphatic alcohol containing from 1 to 3 carbon atoms per molecule.

3. The method of claim 1 in which said solvent is isopropanol.

4. The method of claim 1 in which the direction of flow is reversed at least once during the injection of the fracturing fluid and the treating solution into the formation, whereby any portion of the fracture entering a water-bearing zone is more effectively sealed and further propagation of the fracture into the water-bearing zone is minimized.

References Cited in the file of this patent

UNITED STATES PATENTS

| | | |
|---|---|---|
| 2,708,974 | Fischer et al. | May 24, 1955 |
| 2,805,721 | Maly | Sept. 10, 1957 |